United States Patent
Koop et al.

(10) Patent No.: US 10,975,235 B2
(45) Date of Patent: Apr. 13, 2021

(54) METHOD FOR PRODUCING AMINO METHYLATED BEAD POLYMERIZATES

(71) Applicant: LANXESS Deutschland GmbH, Cologne (DE)

(72) Inventors: Bernd Koop, Cologne (DE); Areski Rezkallah, Bergisch Gladbach (DE); Georg Martin, Langenfeld (DE); Pierre Vanhoorne, Monheim (DE); Reinhold Klipper, Cologne (DE); Sladjana Baljak, Hamburg (DE)

(73) Assignee: LANXESS Deutschland GmbH, Cologne (DE)

( * ) Notice: Subject to any disclaimer, the term of this patent is extended or adjusted under 35 U.S.C. 154(b) by 89 days.

(21) Appl. No.: 16/309,672

(22) PCT Filed: Jun. 9, 2017

(86) PCT No.: PCT/EP2017/064068
§ 371 (c)(1),
(2) Date: Dec. 13, 2018

(87) PCT Pub. No.: WO2017/220342
PCT Pub. Date: Dec. 28, 2017

(65) Prior Publication Data
US 2019/0119480 A1  Apr. 25, 2019

(30) Foreign Application Priority Data

Jun. 22, 2016 (EP) ..................................... 16175637
Jun. 23, 2016 (EP) ..................................... 16175863

(51) Int. Cl.
| | |
|---|---|
| C08L 25/06 | (2006.01) |
| C08L 71/00 | (2006.01) |
| C08F 212/08 | (2006.01) |
| C08F 212/36 | (2006.01) |
| C08F 4/00 | (2006.01) |
| C08F 8/30 | (2006.01) |
| B01J 41/14 | (2006.01) |
| B01J 41/07 | (2017.01) |
| C08F 8/12 | (2006.01) |

(52) U.S. Cl.
CPC ............... *C08L 25/06* (2013.01); *B01J 41/07* (2017.01); *B01J 41/14* (2013.01); *C08F 4/005* (2013.01); *C08F 8/12* (2013.01); *C08F 8/30* (2013.01); *C08F 212/08* (2013.01); *C08F 212/36* (2013.01); *C08L 71/00* (2013.01); *C08F 2800/20* (2013.01); *C08L 2205/03* (2013.01)

(58) Field of Classification Search
CPC ........ C08L 25/06; C08L 71/00; C08F 212/08; C08F 212/36; C08F 4/00; C08F 8/30; C08F 71/00
See application file for complete search history.

(56) References Cited

U.S. PATENT DOCUMENTS

| | | | | |
|---|---|---|---|---|
| 3,925,264 | A | * 12/1975 | Corte ....................... | B01J 41/14 521/33 |
| 3,989,650 | A | 11/1976 | Lange et al. | |
| 4,232,125 | A | * 11/1980 | Buske ....................... | B01J 41/14 521/32 |
| 4,382,124 | A | 5/1983 | Meitzner et al. | |
| 4,419,245 | A | 12/1983 | Barrett et al. | |
| 4,427,794 | A | 1/1984 | Lange et al. | |
| 4,952,608 | A | 8/1990 | Klipper et al. | |
| 7,053,129 | B1 | 5/2006 | Klipper et al. | |
| 9,968,926 | B2 | 5/2018 | Klipper et al. | |
| 2016/0108199 | A1 | 4/2016 | Klipper et al. | |

FOREIGN PATENT DOCUMENTS

WO  93/12167  6/1993

OTHER PUBLICATIONS

Written Opinion and International Search Report for PCT/EP2017/064068 dated Sep. 25, 2017.

* cited by examiner

*Primary Examiner* — Robert D Harlan
(74) *Attorney, Agent, or Firm* — Nicanor A. Kohncke

(57) ABSTRACT

The invention relates to a process for preparing aminomethylated bead polymers using condensed formaldehydes and carbonyl halides.

18 Claims, No Drawings

METHOD FOR PRODUCING AMINO METHYLATED BEAD POLYMERIZATES

The invention relates to a process for preparing aminomethylated bead polymers using condensed formaldehydes and carbonyl halides.

A standard process for preparing aminomethylated bead polymers in which phthalimide and formaldehyde are converted in the presence of a halogenated solvent and in the presence of sulfuric acid to give bis(phthalimidomethyl) ether and the latter is then converted in the presence of oleum and the bead polymer first to the amidomethylated bead polymer and then by hydrolysis to the aminomethylated bead polymer are known, for example, from EP 1078688 and U.S. Pat. No. 4,952,608.

A disadvantage of this process is that large amounts of chlorinated swelling agents have to be used. The process is therefore environmentally problematic in particular.

A further process for preparing aminomethylated bead polymers is known from U.S. Pat. No. 4,232,125, in which phthalimide and paraformaldehyde and the bead polymer are converted in the presence of a swelling agent, together with sulfuric acid as Friedel-Crafts catalyst, in a one-pot reaction to the phthalimidomethylated bead polymer. The phthalimidomethylated bead polymer is then hydrolysed under alkaline conditions to give the aminomethylated bead polymer.

U.S. Pat. No. 3,989,650 discloses a process for preparing aminomethylated bead polymers, in which N-hydroxyalkylimides or N-hydroxyalkylamides are reacted with carboxylic anhydrides to give their esters and then the bead polymer is amidomethylated in the presence of a swelling agent and a Friedel-Crafts catalyst. N-Hydroxyalkylimides are typically prepared by reacting phthalimide, for example, with formaldehyde and then isolating it. The amidomethylated bead polymer is then hydrolysed under alkaline conditions to give the amidomethylated bead polymer.

A disadvantage of these processes is that it is either likewise necessary to additionally use large amounts of swelling agents or/and that the degree of functionalization is unsatisfactory.

There was therefore a need for a process for preparing aminomethylated bead polymers, with which the disadvantages of the prior art can be overcome.

It has been found that, surprisingly, amidomethylated bead polymers can be prepared in high yields in the presence of aliphatic saturated or unsaturated carbonyl halides and optionally in the presence of additional aliphatic saturated or unsaturated carboxylic acids. At the same time, it is possible to very substantially dispense with the use of chlorinated organic solvents.

The invention therefore provides a process for preparing aminomethylated bead polymers, characterized in that
a) monomer droplets composed of a mixture comprising at least one monovinylaromatic compound, at least one polyvinylaromatic compound and at least one initiator are converted to a bead polymer and
b) the bead polymer from step a) is reacted with at least one compound of the formula (I) or salts thereof

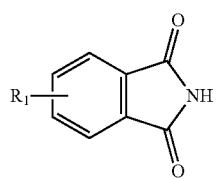

where $R_1=C_1$-$C_3$-alkyl or H and with at least one compound of the formula (II) or cyclic condensates thereof

where n=2 to 100,
in the presence of at least one aliphatic saturated or unsaturated carbonyl halide and optionally in the presence of additional aliphatic saturated or unsaturated carboxylic acids, and
in the presence of at least one Friedel-Crafts catalyst,
to give a phthalimidomethylated bead polymer, and
c) the phthalimidomethylated bead polymer from step b.) is hydrolysed to give an aminomethylated bead polymer.

$R_1$ is preferably H. If $R_1$=H, the compound of the formula (I) is phthalimide. Compounds of the formula (I) are preferably phthalimide and salts or acid addition compounds thereof. Acid addition compounds may be understood to mean, for example, the adducts with hydrochloric acid or sulfuric acid.

Preferably, n=2 to 30. More preferably, n=8 to 30.

The compounds of the formula (II) may be linear or else cyclic condensates of formaldehyde, including trioxane for example. Preference is given to using, as compounds of the formula (II), paraformaldehyde or trioxane or mixtures of these compounds. More preferably, the compounds of the formula (II) are paraformaldehyde.

Carbonyl halides used in process step b) may, for example and with preference, be aliphatic saturated or unsaturated mono-, di- or tricarbonyl halides that are liquid at temperatures between 10° C. and 60° C., for example succinyl chloride, oxalyl chloride, adipyl chloride, maleyl chloride, acetyl chloride, butyryl chloride, propionyl chloride, hexanoyl chloride, pentanoyl chloride and isomers thereof, for example valeryl chloride, isovaleryl chloride, 2-methylbutyryl chloride, pivaloyl chloride, malonyl chloride, fumaryl chloride, succinyl bromide, oxalyl bromide, adipyl bromide, fumaryl bromide, maleyl bromide, acetyl bromide, butyryl bromide, propionyl bromide, hexanoyl bromide, pentanoyl bromide, isovaleryl bromide, malonyl bromide, 2-methylbutyryl bromide or pivaloyl bromide. Carbonyl halides used in process step b) are more preferably aliphatic and saturated monocarbonyl chlorides or/and bromides, especially monocarbonyl chlorides or/and bromides that are liquid at temperatures between 10° C. and 60° C. Very particular preference is given to using acetyl chloride or pentanoyl chloride and the valeryl chloride, isovaleryl chloride, 2-methylbutyryl chloride or pivaloyl chloride isomers thereof. Even further preference is given to using acetyl chloride.

In process step b.), it is also optionally possible to use further aliphatic saturated or unsaturated mono-, di- or tricarboxylic acids. Preference is given to using mixtures of aliphatic saturated or unsaturated mono-, di- or tricarboxylic acids and aliphatic saturated or unsaturated mono-, di- or tricarbonyl halides.

Carboxylic acids used in process step b) may, for example and with preference, be liquid saturated or unsaturated mono-, di- or tricarboxylic acids that are liquid at temperatures between 10° C. and 120° C., for example formic acid, acetic acid, butyric acid, propanoic acid, hexanoic acid or heptanoic acid.

Preferably, the carbonyl halides and the corresponding carboxylic acids are used in mixtures, i.e., for example, valeryl chloride with valeric acid or acetyl chloride with acetic acid. More preferably, carboxylic acids used in process step b) are aliphatic and saturated monocarboxylic acids that are liquid at temperatures between 10° C. and 120° C. Most preferably, acetyl chloride is used with acetic acid as a mixture. If mixtures of carbonyl halide and carboxylic acid are used, the molar ratio of carbonyl halide to carboxylic acid is generally between 100:1 to 1:100. Preferably, the molar ratio of carbonyl halide to carboxylic acid is between 10:1 to 1:100. More preferably, the molar ratio between carbonyl halide to carboxylic acid is between 10:1 and 1:10. Even further preferably, the molar ratio between carbonyl halide to carboxylic acid is between 1:1 and 1:10.

Friedel-Crafts catalysts used in process step b) may preferably be strong inorganic or organic protic acids or Lewis acids, for example zinc chloride, aluminium chloride, tin tetrachloride, iron(III) chloride, iron (III) bromide or further iron(III) salts or mixtures of these compounds.

Friedel-Crafts catalysts used are, for example and with preference, aliphatic or aromatic methane-, benzene- and toluenesulfonic acids, hydrochloric acid, sulfuric acid, oleum, nitric acid or phosphoric acid or mixtures of these acids. Organic protic acids used may, for example, be aliphatic or aromatic methane-, benzene- and toluenesulfonic acids or fluorosulfonic acid. The Friedel-Crafts catalyst used is preferably sulfuric acid.

The scope of the invention encompasses all radical definitions, parameters and elucidations above and detailed hereinafter, in general terms or mentioned within areas of preference, together with one another, i.e. including any combination between the respective areas and areas of preference.

In process step a), at least one monovinylaromatic compound and at least one polyvinylaromatic compound are used. However, it is also possible to use mixtures of two or more monovinylaromatic compounds and mixtures of two or more polyvinylaromatic compounds.

In the context of the present invention, monovinylaromatic compounds used in process step a) are preferably styrene, vinyttoluene, ethylstyrene, α-methylstyrene, chlorostyrene, t-butylstyrene, vinylnapthalene or chloromethyistyrene or mixtures of these compounds.

It is especially preferable to use styrene or mixtures of styrene with the abovementioned monomers, preferably with ethylstyrene.

Preferred polyvinylaromatic compounds in the context of the present invention for process step a) are divinylbenzene, divinyttoluene, trivinylbenzene, divinylnaphthalene, trivinylnaphthalene, especially preferably divinylbenzene.

The polyvinylaromatic compounds are preferably used in amounts of 1%-20% by weight, more preferably 2%-12% by weight, especially preferably 4%-10% by weight, based on the monomer or mixture thereof with other monomers. The nature of the polyvinylaromatic compounds (crosslinkers) is selected with regard to the later use of the bead polymer. In the case of use of divinylbenzene, commercial qualities of divinylbenzene also comprising ethylvinylbenzene as well as the isomers of divinylbenzene are adequate.

The term "bead polymer" for the purposes of the invention is a crosslinked polymer in bead form.

The terms "microporous" or "in gel form" and "macroporous" have already been described in detail in the specialist literature.

Macroporous bead polymers are preferably formed by addition of inert materials, preferably at least one porogen, to the monomer mixture in the course of polymerization, in order to produce a macroporous structure in the bead polymer. Especially preferred porogens are hexane, octane, isooctane, isododecane, methyl ethyl ketone, butanol or octanol, and isomers thereof. Particularly suitable substances are organic substances which dissolve in the monomer but dissolve or swell the bead polymer sparingly (precipitant for polymers), for example aliphatic hydrocarbons (Farbenfabriken Bayer DBP 1045102, 1957; DBP 1113570, 1957).

U.S. Pat. No. 4,382,124 uses, as porogen, the alcohols having 4 to 10 carbon atoms which are likewise to be used with preference in the context of the present invention for preparation of monodisperse, macroporous bead polymers based on styrene/divinylbenzene. In addition, an overview of the preparation methods for macroporous bead polymers is given.

Preferably, in process step a), at least one porogen is added. Preferably, the aminomethylated bead polymers have a macroporous structure.

The bead polymers prepared in process step a) can be prepared in heterodisperse or monodisperse form.

The preparation of heterodisperse bead polymers is accomplished by general processes known to those skilled in the art, for example with the aid of suspension polymerization.

Preference is given to preparing monodisperse bead polymers in process step a).

In the present application, monodisperse materials are those in which at least 90% by volume or % by mass of the particles have a diameter within the range of +10% of the most common diameter.

For example, in the case of a material having a most common diameter of 0.5 mm, at least 90% by volume or % by mass is within a size range between 0.45 mm and 0.55 mm; in the case of a material having a most common diameter of 0.7 mm, at least 90% by volume or % by mass is within a size range between 0.77 mm and 0.63 mm.

In a preferred embodiment of the present invention, in process step a), microencapsulated monomer droplets are used in the preparation of monodisperse bead polymers.

Useful materials for microencapsulation of the monomer droplets are those known for use as complex coacervates, especially polyesters, natural and synthetic polyamides, polyurethanes or polyureas.

Gelatin is a natural polyamide used with preference. Gelatin is especially employed in the form of coacervate and complex coacervate. For the purposes of the invention, gelatin-containing complex coacervates are, in particular, combinations of gelatin with synthetic polyelectrolytes. Suitable synthetic polyelectrolytes are copolymers incorporating units of, for example, maleic acid, acrylic acid, methacrylic acid, acrylamide and methacrylamide. Particular preference is given to using acrylic acid and acrylamide. Gelatin-containing capsules can be hardened with conventional hardeners, for example formaldehyde or glutaraldehyde. The encapsulation of monomer droplets with gelatin, gelatin-containing coacervates and gelatin-containing complex coacervates is described in detail in EP-A 0 046 535. The methods for encapsulation with synthetic polymers are known. Preference is given to phase interfacial condensation, in which a reactive component dissolved in the monomer droplet (especially an isocyanate or an acid chloride) is reacted with a second reactive component dissolved in the aqueous phase (especially an amine).

The heterodisperse or optionally microencapsulated monodisperse monomer droplets contain at least one initiator or mixtures of initiators (initiator combination) to trigger the polymerization. Initiators preferred for the process according to the invention are peroxy compounds, especially preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethyihexanoate, 2,5-bis(2-ethylhexanoylperoxy)-2,5-dimethylhexane or tert-amylperoxy-2-ethyihexane, and also azo compounds such as 2,2'-azobis(isobutyronitrile) or 2,2'-azobis(2-methylisobutyronitrile).

The initiators are preferably used in amounts of 0.05% to 2.5% by weight, more preferably 0.1% to 1.5% by weight, based on the monomer mixture.

The optionally monodisperse microencapsulated monomer droplet may optionally also contain up to 30% by weight (based on the monomer) of crosslinked or uncrosslinked polymer. Preferred polymers derive from the aforementioned monomers, more preferably from styrene.

In the preparation of monodisperse bead polymers, in process step a), the aqueous phase, in a further preferred embodiment, may comprise a dissolved polymerization inhibitor. In this case, useful inhibitors are either inorganic or organic substances. Preferred inorganic inhibitors are nitrogen compounds, especially preferably hydroxylamine, hydrazine, sodium nitrite and potassium nitrite, salts of phosphorous acid such as sodium hydrogen phosphite, and sulfur compounds such as sodium dithionite, sodium thiosulfate, sodium sulfite, sodium bisulfite, sodium thiocyanate and ammonium thiocyanate. Examples of organic inhibitors are phenolic compounds such as hydroquinone, hydroquinone monomethyl ether, resorcinol, pyrocatechol, tert-butylpyrocatechol, pyrogallol and condensation products of phenols with aldehydes. Further preferred organic inhibitors are nitrogen compounds. Especially preferred are hydroxylamine derivatives, for example N,N-diethylhydroxylamine, N-isopropylhydroxylamine and sulfonated or carboxylated N-alkylhydroxylamine or N,N-dialkylhydroxylamine derivatives, hydrazine derivatives, for example N,N-hydrazinodiacetic acid, nitroso compounds, for example N-nitrosophenylhydroxylamine, N-nitrosophenylhydroxylamine ammonium salt or N-nitrosophenylhydroxylamine aluminium salt. The concentration of the inhibitor is generally 5-1000 ppm (based on the aqueous phase), preferably 10-500 ppm, more preferably 10-250 ppm.

The polymerization of the optionally microencapsulated monodisperse monomer droplets to give the monodisperse bead polymer is effected, as already mentioned above, optionally or preferably in the presence of one or more protective colloids in the aqueous phase. Suitable protective colloids are natural or synthetic water-soluble polymers, preferably gelatin, starch, polyvinyl alcohol, polyvinylpyrrolidone, polyacrylic acid, polymethacrylic acid or copolymers of (meth)acrylic acid and (meth)acrylic esters. Preference is further given to cellulose derivatives, especially cellulose esters and cellulose ethers, such as carboxymethyl cellulose, methyl hydroxyethyl cellulose, methyl hydroxypropyl cellulose and hydroxyethyl cellulose. Gelatin is especially preferred. The amount of the protective colloids used is generally 0.05% to 1% by weight, based on the aqueous phase, preferably 0.05% to 0.5% by weight.

The polymerization to give the monodisperse bead polymer can, in an alternative preferred embodiment, be conducted in the presence of a buffer system. Preference is given to buffer systems which set the pH of the aqueous phase on commencement of the polymerization to a value between 14 and 6, preferably between 12 and 8. Under these conditions, protective colloids having carboxylic acid groups are wholly or partly present as salts. This causes a favourable effect on the action of the protective colloids. Particularly suitable buffer systems contain phosphate or borate salts. The terms "phosphate" and "borate" in the context of the invention also encompass the condensation products of the ortho forms of corresponding acids and salts. The concentration of the phosphate or borate in the aqueous phase is generally 0.5-500 mmol/l, especially 2.5-100 mmol/l.

The stirrer speed in the polymerization to give the monodisperse bead polymer is less critical and, in contrast to conventional bead polymerization, has no effect on the particle size. Low stirrer speeds are employed, these being sufficient to keep the suspended monomer droplets in suspension and to promote the removal of the heat of polymerization. For this task, it is possible to use various stirrer types. Particularly suitable stirrers are gate stirrers having axial action.

The volume ratio of encapsulated monomer droplets to aqueous phase is 1:0.75 to 1:20, preferably 1:1 to 1:6.

The polymerization temperature to give the monodisperse bead polymer is guided by the decomposition temperature of the initiator used. It is generally between 50 to 180° C., preferably between 55 and 130° C. Polymerization takes 0.5 to about 20 hours. It has been found to be useful to employ a temperature programme in which the polymerization is commenced at low temperature, for example 60° C., and the reaction temperature is raised with increasing polymerization conversion. In this way, for example, the requirement for reliable running of the reaction and high polymerization conversion can be fulfilled very efficiently. After the polymerization, the monodisperse bead polymer is isolated by conventional methods, for example by filtering or decanting, and optionally washed.

The preparation of the monodisperse bead polymers with the aid of the jetting principle or the seed-feed principle is known from the prior art and described, for example, in U.S. Pat. No. 4,444,961, EP-A 0 046 535, U.S. Pat. No. 4,419,245 or WO 93/12167.

Preference is given to preparing the monodisperse bead polymers with the aid of the jetting principle or the seed-feed principle.

Preference is given to preparing, in process step a), a macroporous, monodisperse bead polymer.

Process step b) can be conducted in different ways. The bead polymer could, for example, first be initially charged and a mixture of the compounds of the formula (I) and the compounds of the formula (II), the carbonyl halides, optionally mixed with the carboxylic acids and the Friedel-Crafts catalysts, could be added thereto. However, it would be equally possible first to initially charge the carbonyl halides, optionally mixed with carboxylic acids, and then to add the bead polymer and then to add the compounds of the formula (I) and then the Friedel-Crafts catalysts. Other sequences of addition are also conceivable.

Preferably, the compounds of the formula (I) and the compounds of the formula (II) are first mixed with the carboxylic acids. Then the Friedel-Crafts catalysts are added. Thereafter, the mixture is preferably heated and then further Friedel-Crafts catalysts are preferably added. Preferably, the temperature of the mixture is increased further thereafter. The reaction mixture is worked up by processes known to those skilled in the art. Preferably, the phthalimidomethylated bead polymer is filtered off. The procedure is preferably effected in a one-pot method without further separation and purification of reaction products formed as intermediates.

The amount of Friedel-Crafts catalyst which is used in process step b) is generally 0.01 to 20 mol per mole of compounds of the formula (I), but may also be smaller or greater. Preference is given to using 0.1 mol to 5 mol of Friedel-Crafts catalyst per mole of compounds of the formula (I). Particular preference is given to using 1 to 5 mol of Friedel-Crafts catalyst per mole of compounds of the formula (I).

The amount of carbonyl halides which is used in process step b) is generally 0.5 to 10 mol per mole of compounds of the formula (I), but may also be smaller or greater. Preference is given to using 1 to 7 mol of carboxylic acid halides per mole of compounds of the formula (I). Particular preference is given to using 1 to 4 mol of carbonyl halides per mole of compounds of the formula (I). The amount of carbonyl halides which is used in process step b) is generally $10^{-5}$ mol to 0.06 mol per gram of bead polymer, but may also be smaller or greater. Preference is given to using from 0.001 to 0.05 mol of carbonyl halides per gram of bead polymer.

The compounds of the formula (I) are generally used in process step b) in an amount of 0.01 to 1.0 mol per gram of compounds of the formula (II). The amount may also be smaller or greater. Preferably, the compounds of the formula (I) are used in process step b) in an amount of 0.01 to 0.05 mol per gram of compounds of the formula (II).

It is additionally also possible to use swelling agents, for example organic solvents, for example dichloromethane, dichloroethane, especially 1,2-dichloroethane, tetrachloroethane, dichloropropane, pentachloropropane, dimethylformamide, sulfolanes, nitropropanes or nitrobenzene. However, in the process according to the invention, it is also possible to completely dispense with the use of the swelling agents. If swelling agents are nevertheless used, the content of swelling agents in process step b) is preferably less than 10% by weight based on the total amount of reactants used. More preferably, the content of swelling agents is less than 5% by weight, based on the total amount of the reactants. Process step b) is most preferably conducted without addition of swelling agents. Preferably, the temperature at which process step b) is conducted is between 50° C. and 140° C.

Preferably, the compounds of the formula (I) and of the compounds of the formula (II), the bead polymer, of the aliphatic saturated or unsaturated carbonyl halides, the Friedel-Crafts catalysts and optionally the carboxylic acids used in process step b) are present together in an amount greater than 80% by weight in the reaction mixture, based on the total amount of the reaction mixture.

Preferably, the compounds of the formula (I) and of the compounds of the formula (II), the bead polymer, the aliphatic saturated or unsaturated carbonyl halides, the Friedel-Crafts catalysts and optionally the carboxylic acids used in process step b) are present together in an amount greater than 96% by weight in the reaction mixture, based on the total amount of the reaction mixture.

In process step c), in general, the conversion of the phthalimidomethylated bead polymer to the aminomethylated bead polymer is effected with aqueous or alcoholic solutions of an alkali metal hydroxide such as sodium hydroxide or potassium hydroxide. In addition, process step c) is generally conducted at temperatures between 100° C. and 250° C., but may alternatively be conducted at higher or lower temperatures. Preferably, process step c) is conducted at temperatures between 120° C. and 190° C. Preferably, the conversion of the phthalimidomethylated bead polymer to the aminomethylated bead polymer in process step c) is effected with alkali metal or alkaline earth metal hydroxides or mixtures of these compounds, more preferably with alkali metal hydroxides, such as sodium hydroxide in particular. Preferably, the conversion in process step c) proceeds in the presence of an aqueous or alcoholic solution of an alkali metal hydroxide. The concentration of the aqueous sodium hydroxide solution is in the range from 10 to 50 wt %, preferably 20 to 40 wt %. The resultant aminomethylated bead polymer is preferably washed with demineralized water to free it of alkaline, but may alternatively be treated with other aqueous solutions or non-demineralized water.

The aminomethylated bead polymer may be used as anion exchanger or be converted further to chelate resins.

The conversion of the aminomethylated bead polymers obtained in process step c) to chelate resins is effected by standard methods known to those skilled in the art.

For example, chelate resins containing iminodiacetic acid groups can be prepared by reacting the aminomethyl group-containing bead polymer from process step c) in aqueous suspension with chloroacetic acid or derivatives thereof. It is likewise possible to react the aminomethylated bead polymers obtained in process step c) in sulfuric acid suspension with formalin in combination with P—H-acidic compounds (via a modified Mannich reaction) to give chelate resins having phosphonic acid groups.

With the aid of the process according to the invention, it is possible to prepare aminomethylated bead polymers with high yields, based on the amount of aminomethyl groups introduced.

The aminomethylated bead polymers prepared in accordance with the invention can be used as weakly basic anion exchangers or be converted to chelate resins.

In addition, it is possible to dispense with the use of toxic chlorinated organic solvents in the process according to the invention.

Determination of Amount of Basic Aminomethyl Groups in the Aminomethylated Bead

Polymer 100 ml of the aminomethylated bead polymer are agitated down in the tamp volumeter and subsequently washed with demineralized water into a glass column. 1000 ml of 2% by weight aqueous sodium hydroxide solution are passed through the column in the course of 1 hour and 40 minutes.

Demineralized water is then passed through until 100 ml of eluate with added phenolphthalein have a consumption of not more than 0.05 ml.

50 ml of the resin are admixed in a beaker with 50 ml of demineralized water and 100 ml of 1 N hydrochloric acid.

The suspension is stirred for 30 minutes and then filled into a glass column. The liquid is drained off. A further 100 ml of 1 N hydrochloric acid are passed through the resin for 20 minutes. 200 ml of methanol are then passed through. All of the eluates are collected and combined and titrated with 1 N sodium hydroxide solution using methyl orange.

The number of aminomethyl groups in 1 litre of aminomethylated bead polymer is calculated by the following formula:

(200V)*20=mol of aminomethyl groups per litre of aminomethylated bead polymer.

EXAMPLES

Example 1

1.1 Preparation of a Monodisperse Macroporous Bead Polymer Based on Styrene, Divinylbenzene and Ethyistyrene A 10 l glass reactor is charged with 3000 g of demineralized water, and a solution of 10 g of gelatin, 16 g of disodium hydrogenphosphate dodecahydrate and 0.73 g of resorcinol in 320 g of deionized water is added and mixed in. The mixture is equilibrated to 25° C. Subsequently, while stirring, a mixture of 3200 g of microencapsulated monomer droplets having a narrow particle size distribution, composed of 3.6% by weight of divinylbenzene and 0.9% by weight of ethylstyrene (used in the form of a commercial isomer mixture of divinylbenzene and ethylstyrene with 80% divinylbenzene), 0.5% by weight of dibenzoyl peroxide, 56.2% by weight of styrene and 38.8% by weight of isododecane is applied, the microcapsule consisting of a formaldehyde-hardened complex coacervate composed of gelatin and a copolymer of acrylamide and acrylic acid, and 3200 g of aqueous phase having a pH of 12 are added.

The mixture is stirred and polymerized to completion by increasing the temperature in accordance with a temperature programme beginning at 25° C. and ending at 95° C. The mixture is cooled, washed over a 32 μm sieve and then dried at 80° C. under reduced pressure. This gives 1893 g of a spherical bead polymer having a narrow particle size distribution.

1.2 Preparation of a Phthalimidomethylated Bead Polymer with Sulfuric Acid as Friedel-Crafts Catalyst 316 g of acetic acid are initially charged in a round-bottom flask. To this are added 62.8 g of paraformaldehyde and 286.9 g of phthalimide. Subsequently, 9.6 g of (100%) sulfuric acid are added dropwise to the suspension, and the mixture is heated up to 70° C. and stirred at this temperature for 1 hour. Subsequently, 180 g of acetyl chloride are added dropwise within 0.5 hours. Thereafter, 159.2 g of monodisperse bead polymer from example 1.1 are added and then 277.3 g of (100%) sulfuric acid are metered in within 2 hours. The suspension is heated to 115° C. and stirred at this temperature for a further 10 hours. The mixture is cooled down to 70° C. and the beads are separated off on a sieve. Subsequently, the beads are washed twice at 70° C. with acetic acid and three times at 70° C. with demineralized water.

Volume yield: 990 ml
Nitrogen content (after drying): 5.4%

1.3 Preparation of a Phthalimidomethylated Bead Polymer with Sulfuric Acid as Friedel-Crafts Catalyst At room temperature, 176 g of acetic acid and 203 g of acetyl chloride are initially charged in a round-bottom flask. To this are added 159.2 g of monodisperse bead polymer from example 1.1, and the mixture is stirred at room temperature for 30 min. Subsequently, 286.9 g of phthalimide and 62.8 g of paraformaldehyde are introduced and the mixture is left to stir for a further 30 min. The mixture is heated up to 60° C. and 286.9 g of (100%) sulfuric acid are added dropwise within 2 h. The temperature is increased to 115° C. and then the mixture is stirred at this temperature for a further 10 h. The mixture is cooled down to 70° C. and the beads are separated off on a sieve. Subsequently, the beads are washed twice at 70° C. with acetic acid and three times at 70° C. with demineralized water.

Volume yield: 1045 ml
Nitrogen content (after drying): 5.4%

1.4 Preparation of a Heterodisperse, Macroporous Bead Polymer Containing Aminomethyl Groups 722 g of demineralized water and 384 g of 50%/a aqueous sodium hydroxide solution are initially charged at room temperature. 800 ml of phthalimidomethylated bead polymer from example 1.2 are metered into the initial charge. The suspension is heated in an autoclave to 180° C. for 2 hours while stirring and stirred at this temperature for a further 8 hours. After cooling, the suspension is applied to a sieve. The aminomethylated bead polymer obtained is washed with demineralized water.

Volume yield: 635 ml
HCl number: 2.01 mol/litre of resin

Comparative Example 1 (Noninventive)

At room temperature, 234 g of acetic acid are initially charged in a round-bottom flask. To this are added 62.8 g of paraformaldehyde and 286.9 g of phthalimide. Subsequently, 10 g of (100%) sulfuric acid are added dropwise to the suspension, and the mixture is heated up to 70° C. and left to stir at 70° C. for 1 hour. Subsequently, 199 g of acetic anhydride are added dropwise within 0.5 hour. Thereafter, 159 g of monodisperse bead polymer from example 1 are added and then 372.9 g of (100%) sulfuric acid are metered in within 2 hours. The suspension is heated up to 115° C. and stirred at this temperature for a further 10 hours. The mixture is cooled down to 70° C. and the beads are separated off on a sieve. Subsequently, the beads are washed twice at 70° C. with acetic acid and three times at 70° C. with demineralized water.

Volume yield: 855 ml
Nitrogen content (after drying): 5.1%

What is claimed is:
1. A process for preparing aminomethylated bead polymers, the process comprising:
   a) converting monomer droplets comprising at least one monovinylaromatic compound, at least one polyvinylaromatic compound, and at least one initiator to a bead polymer,
   b) contacting the bead polymer with:
      at least one compound of the formula (I) or salts thereof

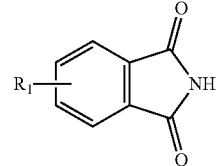

(I)

where $R_1 = C_1$-$C_3$-alkyl or H, and
at least one compound of the formula (II) or the cyclic condensates thereof

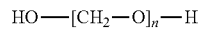

(II)

where n=2 to 100,
in a reaction mixture comprising at least one Friedel-Crafts catalyst, at least one aliphatic saturated or unsaturated carbonyl halide, and additional aliphatic saturated or unsaturated carboxylic acids,
to give a phthalimidomethylated bead polymer, and
   c) hydrolyzing the phthalimidomethylated bead polymer to give an aminomethylated bead polymer.

2. The process according to claim 1, wherein the at least one monovinylaromatic compound is selected from the group consisting of styrene, α-methylstyrene, vinyltoluene, ethylstyrene, t-butylstyrene, chlorostyrene, bromostyrene, chloromethylstyrene, vinylnaphthalene, and mixtures of these compounds.

3. The process according to claim 1, wherein the at least one polyvinylaromatic compound is selected from the group consisting of divinylbenzene, divinyltoluene, trivinylbenzene, and mixtures of these compounds.

4. The process according to claim 1, wherein the at least one monovinylaromatic compound is styrene, and the at least one polyvinylaromatic compound is divinylbenzene.

5. The process according to claim 1, wherein $R_1$=H.

6. The process according to claim 1, wherein n=8 to 30.

7. The process according to claim 1, wherein the at least one carbonyl halide comprises at least one of: aliphatic and saturated monocarbonyl chlorides that are liquid at temperatures between 10° C. and 60° C.; and aliphatic and saturated monocarbonyl bromides that are liquid at temperatures between 10° C. and 60° C.

8. The process according to claim 1, wherein the bead polymer is contacted with the at least one compound of the formula (I) or salts thereof and the at least one compound of the formula (II) or the cyclic condensates thereof in the presence of a mixture of acetyl chloride and acetic acid.

9. The process according to claim 8, the acetyl chloride and acetic acid are present in the mixture at a ratio of acetyl chloride to acetic acid of 1:1 to 1:10.

10. The process according to claim 1, wherein the Friedel-Crafts catalyst is used in an amount of 1 to 5 mol per mole of the compound of the formula (I).

11. The process according to claim 1, wherein the at least one carbonyl halide is used in an amount of 0.001 to 0.05 mol per gram of the bead polymer.

12. The process according to claim 1, wherein the at least one carbonyl halide is used in an amount of 1 to 4 mol per mole of compounds of the formula (I).

13. The process according to claim 1, wherein the compounds of the formula (I) are used in an amount of 0.01 to 0.05 mol per gram of the compounds of the formula (II).

14. The process according to claim 1, the conversion in step a) is carried out in the presence of at least one porogen.

15. The process according to claim 1, wherein the amounts of the compounds of the formula (I), the compounds of the formula (II), the bead polymer, the aliphatic saturated or unsaturated carbonyl halides, the Friedel-Crafts catalysts, and any carboxylic acids used, together are greater than 96% by weight in the reaction mixture, based on the total amount of the reaction mixture.

16. The process according to claim 1, wherein:
the at least one monovinylaromatic compound is selected from the group consisting of styrene, α-methylstyrene, vinyltoluene, ethylstyrene, t-butylstyrene, chlorostyrene, bromostyrene, chloromethylstyrene, vinylnaphthalene, and mixtures of these compounds;
the at least one polyvinylaromatic compound is selected from the group consisting of divinylbenzene, divinyltoluene, trivinylbenzene, and mixtures of these compounds;
$R_1$=H;
n=8 to 30;
the at least one carbonyl halide comprises at least one of: aliphatic and saturated monocarbonyl chlorides that are liquid at temperatures between 10° C. and 60° C.; and aliphatic and saturated monocarbonyl bromides that are liquid at temperatures between 10° C. and 60° C.; and
the bead polymer is contacted with the at least one compound of the formula (I) or salts thereof and the at least one compound of the formula (II) or the cyclic condensates thereof in the presence of a mixture of both an aliphatic carbonyl halide, and an aliphatic carboxylic acid.

17. The process according to claim 16, wherein:
the at least one monovinylaromatic compound is styrene, and the at least one polyvinylaromatic compound is divinylbenzene;
the conversion in step a) is carried out in the presence of at least one porogen;
the aliphatic carbonyl halide is acetyl chloride and the aliphatic carboxylic acid is acetic acid, and the acetyl chloride and acetic acid are present at a ratio of acetyl chloride to acetic acid of 1:1 to 1:10;
the Friedel-Crafts catalyst is used in an amount of 1 to 5 mol per mole of the compound of the formula (I);
the at least one carbonyl halide is used in an amount of 0.001 to 0.05 mol per gram of the bead polymer;
the at least one carbonyl halide is used in an amount of 1 to 4 mol per mole of compounds of the formula (I); and
the compounds of the formula (I) are used in an amount of 0.01 to 0.05 mol per gram of the compounds of the formula (II).

18. The process according to claim 17, wherein the amounts of the compounds of the formula (I), the compounds of the formula (II), the bead polymer, the Friedel-Crafts catalyst, the acetyl chloride, and the acetic acid, together are greater than 96% by weight in the reaction mixture, based on the total amount of the reaction mixture.

* * * * *